US011699301B2

(12) United States Patent
Tsai et al.

(10) Patent No.: US 11,699,301 B2
(45) Date of Patent: Jul. 11, 2023

(54) TRANSPARENT DISPLAY SYSTEM, PARALLAX CORRECTION METHOD AND IMAGE OUTPUTTING METHOD

(71) Applicant: INDUSTRIAL TECHNOLOGY RESEARCH INSTITUTE, Hsinchu (TW)

(72) Inventors: Yi-Shou Tsai, Hsinchu (TW);
Shin-Hong Kuo, New Taipei (TW);
Kuan-Ting Chen, Douliu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 154 days.

(21) Appl. No.: 17/148,204

(22) Filed: Jan. 13, 2021

(65) Prior Publication Data

US 2021/0368159 A1    Nov. 25, 2021

(30) Foreign Application Priority Data

May 20, 2020    (TW) ................................. 109116779

(51) Int. Cl.
*H04N 13/383*    (2018.01)
*G06T 7/70*    (2017.01)
(Continued)

(52) U.S. Cl.
CPC ............ *G06V 40/171* (2022.01); *G06T 7/536* (2017.01); *G06T 7/70* (2017.01); *G06V 10/25* (2022.01);
(Continued)

(58) Field of Classification Search
CPC ...... H04N 13/383; H04N 13/39; G06T 7/536; G06T 7/70
See application file for complete search history.

(56) References Cited

U.S. PATENT DOCUMENTS

2013/0009863 A1* 1/2013 Noda ..................... G09G 3/003
345/87
2013/0265232 A1* 10/2013 Yun ....................... G06V 20/20
345/158
(Continued)

FOREIGN PATENT DOCUMENTS

CN    138021330 A    5/2018
CN    109828663 A    5/2019
(Continued)

OTHER PUBLICATIONS

Taiwanese Office Action and Search Report for Taiwanese Application No. 109116779, dated Jul. 12, 2021.

*Primary Examiner* — Rowina J Cattungal
(74) *Attorney, Agent, or Firm* — Birch, Stewart, Kolasch & Birch, LLP (57) ABSTRACT

A parallax correction method for a transparent display system is provided. The transparent display system includes a transparent display device located between a background object and a user. The parallax correction method includes the following steps. A gaze point is displayed on the transparent display device. An image including the transparent display device, the background object and the user is captured. At least two display anchor points and at least two corresponding background object anchor points are detected according to the image. The display anchor points are located on the transparent display device, and the background object anchor points are located on the background object. A plurality of visual extension lines extending from the display anchor points and the corresponding background object anchor points are obtained. An equivalent eye position of the ocular dominance of the user is obtained according an intersection of the visual extension lines.

18 Claims, 10 Drawing Sheets

(51) Int. Cl.
*H04N 13/39* (2018.01)
*G06T 7/536* (2017.01)
*G06V 40/16* (2022.01)
*G06V 10/25* (2022.01)
*G06V 40/18* (2022.01)

(52) U.S. Cl.
CPC .......... *G06V 40/18* (2022.01); *H04N 13/383* (2018.05); *H04N 13/39* (2018.05)

(56) References Cited

U.S. PATENT DOCUMENTS

| | | | |
|---|---|---|---|
| 2014/0049620 A1* | 2/2014 | Sun | H04N 13/366 348/51 |
| 2018/0102077 A1* | 4/2018 | Lin | H04N 13/363 |
| 2018/0165857 A1 | 6/2018 | Lee et al. | |
| 2019/0221150 A1* | 7/2019 | Zou | G09G 3/20 |

FOREIGN PATENT DOCUMENTS

| | | |
|---|---|---|
| TW | I489969 B | 7/2015 |
| TW | 201929786 A | 8/2019 |
| TW | 231939102 A | 10/2019 |

\* cited by examiner

TRANSPARENT DISPLAY SYSTEM, PARALLAX CORRECTION METHOD AND IMAGE OUTPUTTING METHOD

This application claims the benefit of Taiwan application Serial No. 109116779, filed May 20, 2020, the disclosure of which is incorporated by reference herein.

TECHNICAL FIELD

The disclosure relates in general to a transparent display system, a parallax correction method and an image outputting method.

BACKGROUND

Figure 1:
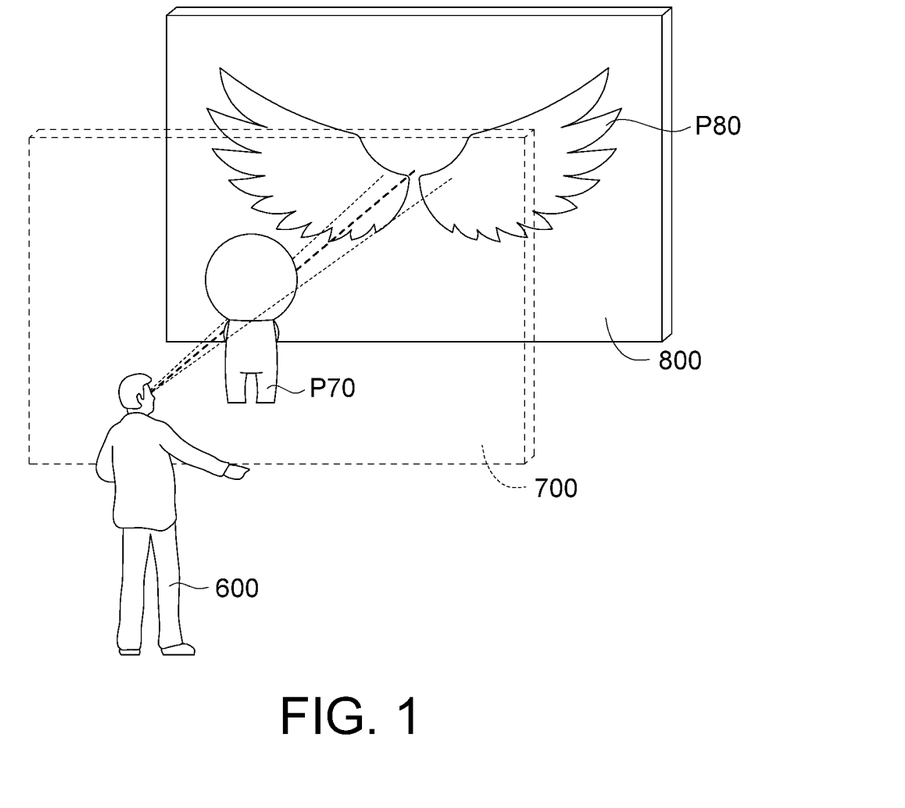
FIG. 1 is a schematic diagram of a transparent display device.

Along with the development of technology, various display devices are provided one after another. Referring to FIG. 1, a schematic diagram of a transparent display device 700 is shown. The transparent display device 700 can be located between a user 600 and a background object 800. The transparent display device 700 can display an image P70. When the user 600 stands in front of the transparent display device 700, the image P70 may be superimposed on the image P80 of the background object 800.

Figure 2:
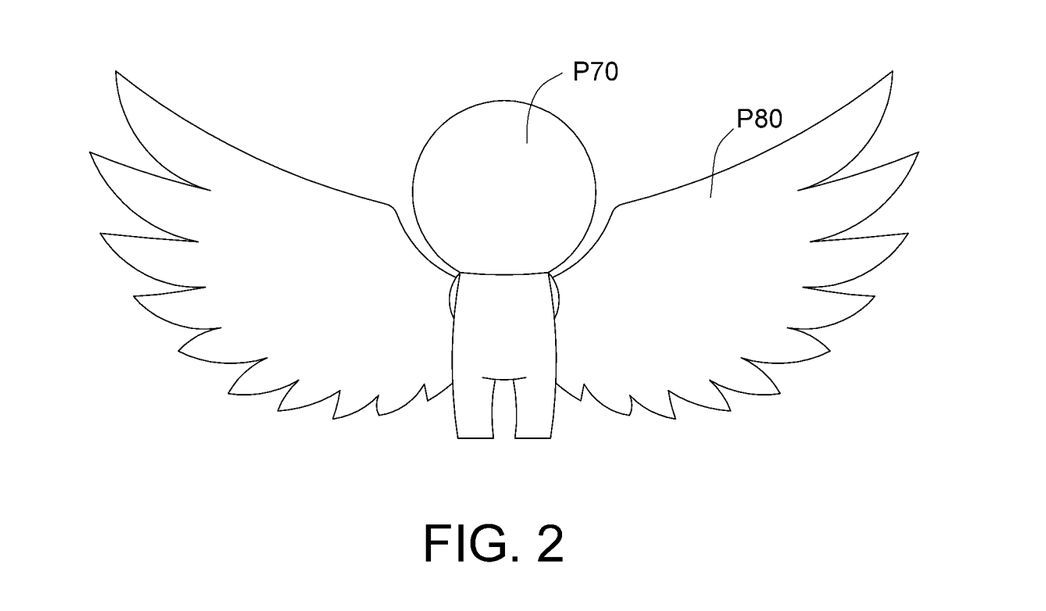
FIG. 2 is a superposition viewed by a user whose ocular dominance is right eye.
Figure 3:
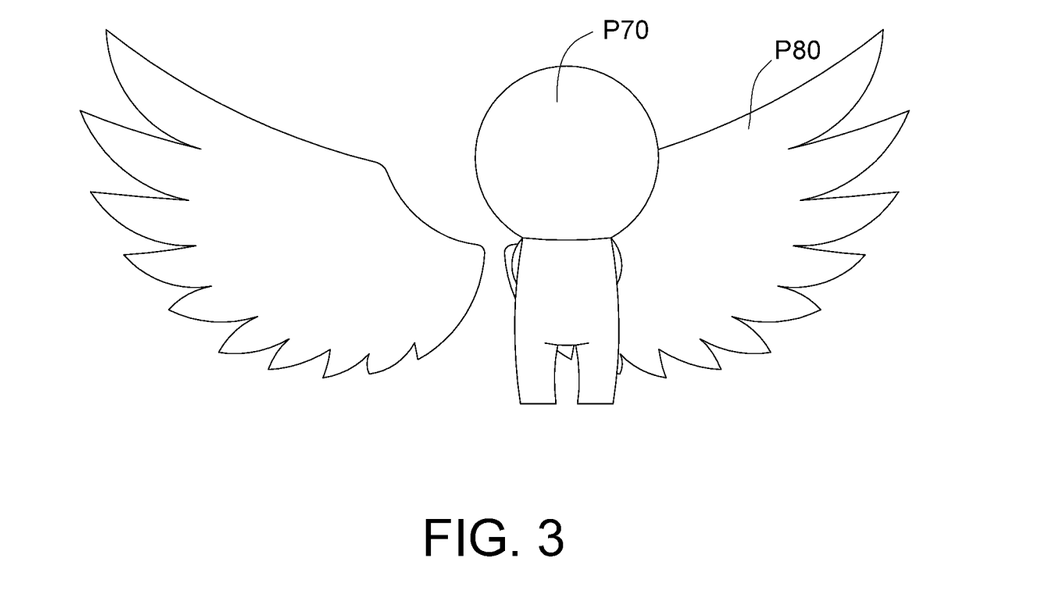
FIG. 3 is a superposition viewed by a user whose ocular dominance is left eye.

The sight of the ocular dominance is determined by the brain. Some people's ocular dominance is left eye, and some others' is right eye. Refer to FIGS. 2 to 3. FIG. 2 is a superposition viewed by a user 600 whose ocular dominance is right eye. FIG. 3 is a superposition viewed by a user 600 whose ocular dominance is left eye. At the same position, the image P70 viewed by the user 600 whose ocular dominance is right eye may be exactly aligned with the center of the image P80, but the image P70 viewed by the user 600 whose ocular dominance is left eye may be biased to the right-hand side of image P80.

Every user 600 has his/her own ocular dominance. The image P70 displayed at the same position of the transparent display device 700 may generate different superpositions to different users 600. However, two users 600 still may have different degrees of parallax despite that their ocular dominances both are right eye. Therefore, the research personnel in the industries are devoted to provide a parallax correction method, which enables the transparent display device 700 to be applicable to the users 600 having different degrees of parallax.

SUMMARY

According to one embodiment, a parallax correction method for a transparent display system is provided. The transparent display system includes a transparent display device located between a background object and a user. The parallax correction method includes the following steps. A gaze point is displayed on the transparent display device. An image including the transparent display device, the background object and the user is captured. At least two display anchor points and at least two corresponding background object anchor points are detected according to the image. The display anchor points are located on the transparent display device, the background object anchor points are located on the background object. A plurality of visual extension lines extending from the display anchor points and the corresponding background object anchor points are obtained. An equivalent eye position of an ocular dominance of the user is obtained according an intersection of the visual extension lines.

According to another embodiment, an image outputting method for a transparent display system is provided. The transparent display system includes a transparent display device located between a background object and a user. The image outputting method includes the following steps. An image including the transparent display device, the background object and the user is captured. An equivalent eye position of an ocular dominance of the user is obtained. A physical position of the background object on the image is detected. A display position on the transparent display device is obtained according to at least a connection line between the equivalent eye position and the physical position. An image is displayed on the transparent display device according to the display position.

According to an alternative embodiment, a transparent display system is provided. The transparent display system includes a transparent display device, an image capturing device, a processing device, and a storage unit. The transparent display device is located between the background object and a user. The transparent display device displays a gaze point. The image capturing device captures an image including the transparent display device, the background object and the user. The processing device is connected to the image detection device. The processing device includes an image analysis unit and a space calculation unit. The image analysis unit is configured to detect at least two display anchor points and at least two corresponding background object anchor points on the image. The display anchor points are located on the transparent display device. The background object anchor points are located on the background object. The space calculation unit is configured to calculate the visual extension lines extending from each of the display anchor points and each of the corresponding background object anchor points, and calculate an equivalent eye position of an ocular dominance of the user according to an intersection of the visual extension lines and the connection line between the two eyes. The storage unit is configured to record the equivalent eye position.

The above and other aspects of the disclosure will become better understood with regard to the following description and the accompanying drawings.

In the following detailed description, for purposes of explanation, numerous details are set forth in order to provide a thorough understanding of the disclosed embodiments. It will be apparent, however, that one or more embodiments may be practiced without these details. In other instances, well-known structures and devices are schematically shown in order to simplify the drawing.

DETAILED DESCRIPTION

Figure 4:
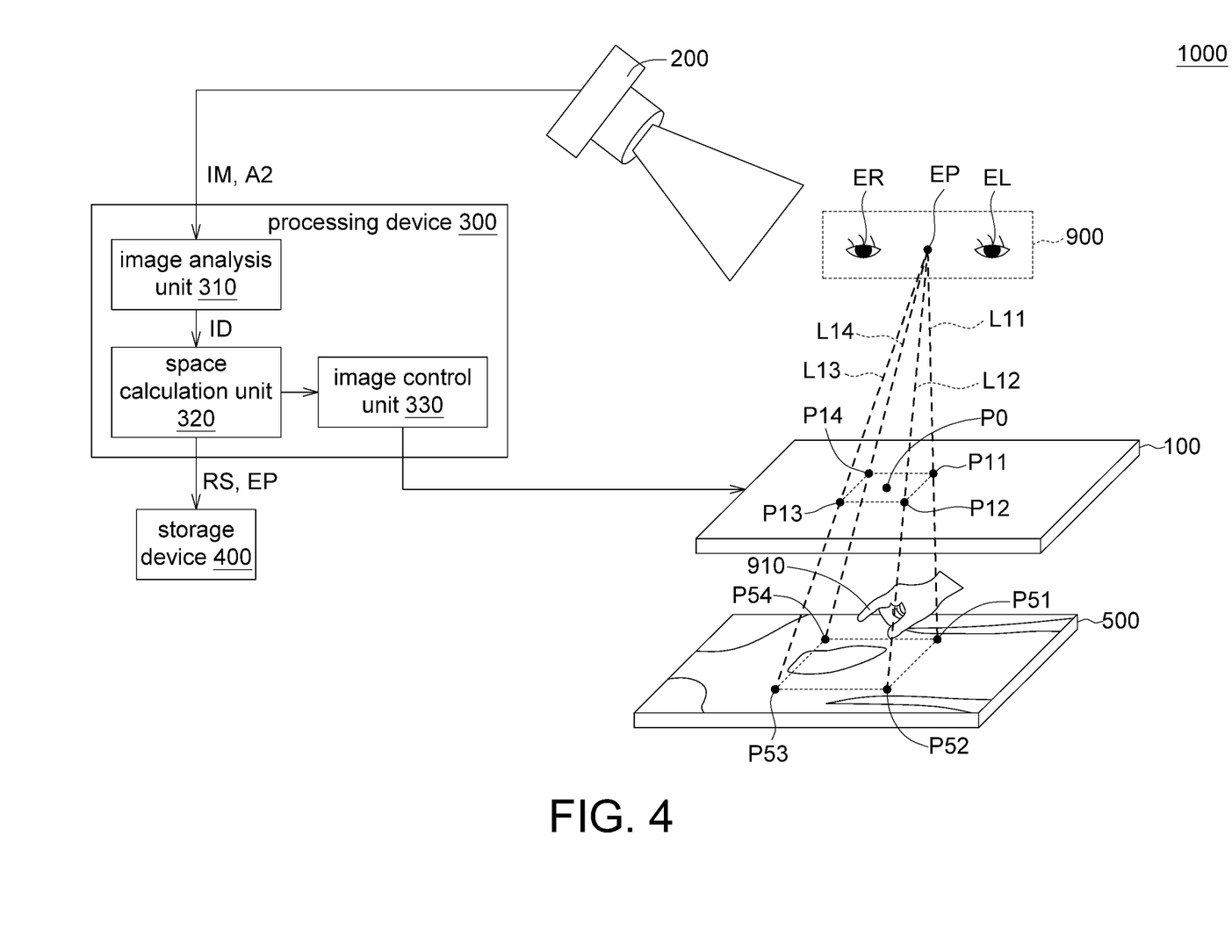
FIG. 4 is a schematic diagram of a transparent display system according to an embodiment.

Referring to FIG. 4, a schematic diagram of a transparent display system 1000 according to an embodiment is shown. The transparent display system 1000 includes a transparent display device 100, an image capturing device 200, a processing device 300 and a storage unit 400. The transparent display device 100 is located between a user 900 and a background object 500. The transparent display system 1000 may be used in the field of smart medicare. The background object 500 is such as an X-ray film. Examples of the transparent display device 100 include transparent liquid crystal display (transparent LCD), transparent organic light emitting diode display (transparent OLED display), transparent micro light emitting diode display (transparent micro LED display), and transparent glass attached with a reflective film. The image capturing device 200 can be configured to capture an image, and can be realized by such as camera, camera, structured light sensor or infrared sensor. The processing device 300 can be configured to execute various programs, such as analysis program, arithmetic program or control program. The processing device 300 can be realized by such as computer, server, cloud computing center or mobile phone. The storage unit 400 can be configured to store data, and can be realized by such as hard drive, memory, CD or cloud storage center.

Figure 5:
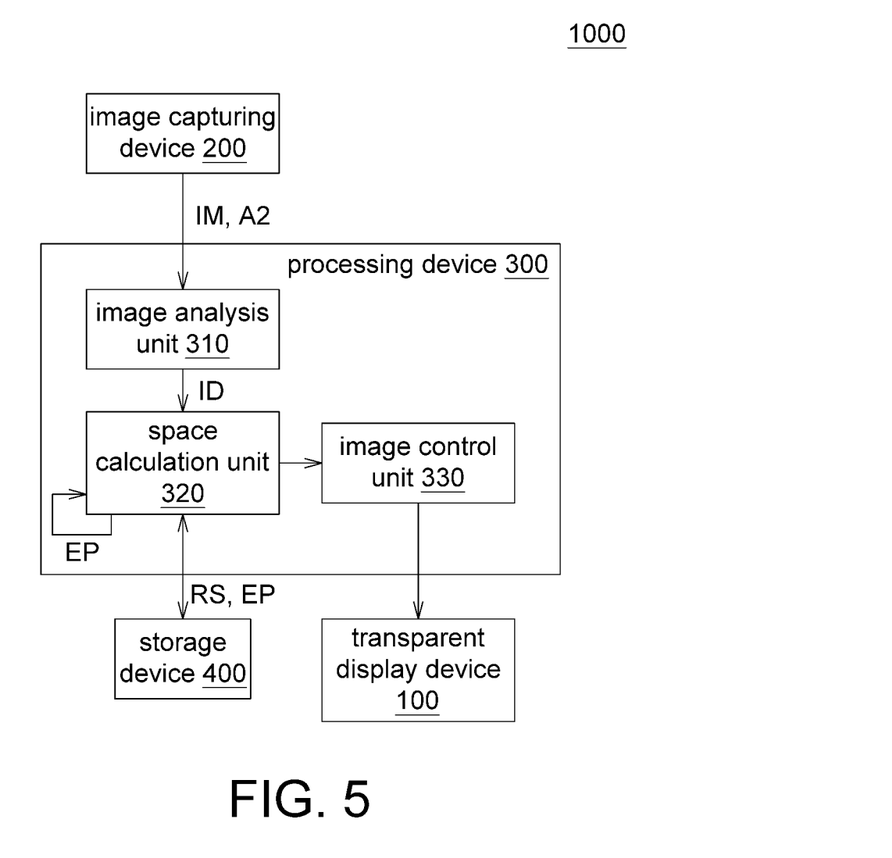
FIG. 5 is a block diagram of a transparent display system according to an embodiment.

Referring to FIG. 5, a block diagram of a transparent display system 1000 according to an embodiment is shown. The processing device 300 includes an image analysis unit 310, a space calculation unit 320 and an image control unit 330. The image analysis unit 310 can be configured to execute the image analysis program. The space calculation unit 320 can be configured to execute an arithmetic program for the three-dimensional data. The image control unit 330 can be configured to execute a control program of the transparent display device 100 to display the images. The image analysis unit 310, the space calculation unit 320 and the image control unit 330 can be realized by such as circuits, chips, or memory devices storing programs.

The transparent display system 1000 of the present embodiment can calculate an equivalent eye position EP of an ocular dominance of a user 900 using a parallax correction method. The equivalent eye position EP is located between the right eye ER and the left eye EL of the user 900. For those whose equivalent eye position EP is close to the right eye ER, their ocular dominance is the right eye ER; for those whose equivalent eye position EP is close to the left eye EL, their ocular dominance is the left eye EL. The equivalent eye position EP calculated according to the present embodiment is an accurate position between the right eye ER and the left eye EL. The display position of the image on the transparent display device 100 can be corrected according to the degree of parallax.

Figure 6:
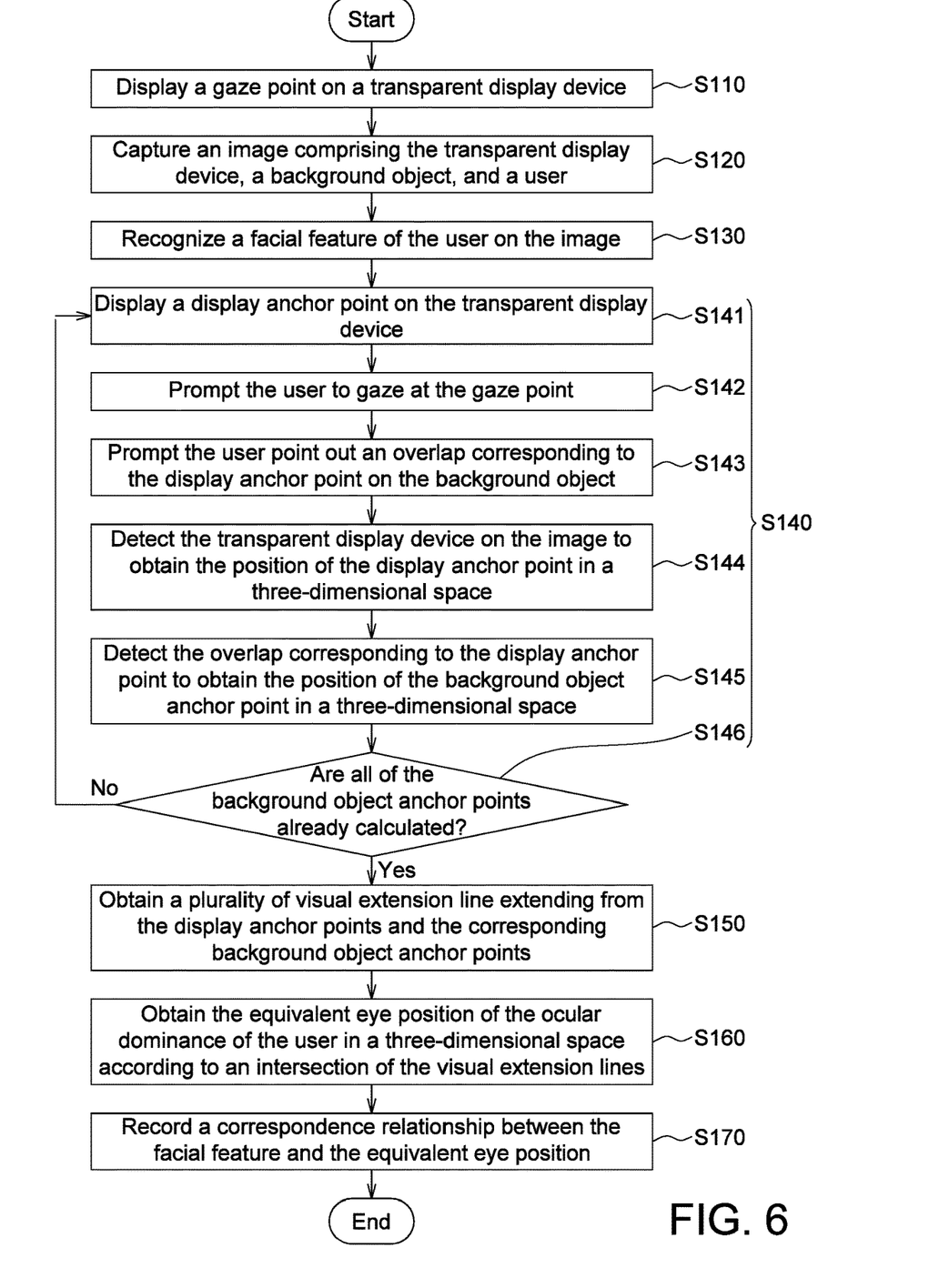
FIG. 6 is a flowchart of a parallax correction method for a transparent display system according to an embodiment.

Referring to FIG. 6, a flowchart of a parallax correction method for a transparent display system 1000 according to an embodiment is shown. The parallax correction method is disclosed below with the schematic diagram of FIG. 4. Firstly, the method begins at step S110, a gaze point P0 is displayed on a transparent display device 100. During the operation process, the user 900 is asked to stand in front of the transparent display device 100, and the gaze point P0 is displayed on the transparent display device 100, such that the gaze point P0 is located in front of the user 900.

Next, the method proceeds step S120, an image IM including the transparent display device 100, the background object 500 and the user 900 is captured by an image capturing device 200.

Then, the method proceeds step S130, a facial feature ID of the user 900 on the image IM is recognized by the image analysis unit 310 of the processing device 300. The identity of the user 900 can be identified through the facial feature ID. The correction information calculated below corresponds to the user 900.

Then, the method proceeds step S140, the display anchor points P11 to P14 (the quantity of the display anchor points can be at least two) and the corresponding background object anchor points P51 to P54 (the quantity of the background object anchor points can be at least two) are detected by the image analysis unit 310 of the processing device 300 according to the image IM. The display anchor points P11 to P14 are located on the transparent display device 100, and the background object anchor points P51 to P54 are located on the background object 500.

In the embodiment of FIG. 4, the display anchor points P11 to P14 can be pre-determined, and the background object anchor points P51 to P54 are clicked on by the user 900 according to his/her sight to confirm the real sight of the user 900.

Step S140 further includes steps S141 to S146. In step S141, the display anchor point P11 is displayed on the transparent display device 100. In an embodiment, the transparent display device 100 can firstly display the display anchor point P11, and then continue to display the next display anchor point P12 after obtaining the background object anchor point P51, and the rest can be obtained by the same analogy. Or, in an embodiment, the transparent display device 100 can concurrently display the display anchor point P11 and the display anchor point P12.

In step S142, the user 900 is prompted to gaze at the gaze point P0. In the present step, a reminder text (such as "Please gaze at the center red dot on the screen") can be displayed through the transparent display device 100; or a reminder voice can be played through a speaker. The sequence of step S141 and step S142 can be swapped.

In step S143, the user 900 is prompted to point out an overlap corresponding to the display anchor point P11 on the background object 500 with his/her fingertip 910. In the present step, a reminder text (such as "Please point out blue dots on the X-ray film with your finger") can be displayed through the transparent display device 100; or a reminder voice can be played through a speaker.

In step S144, the transparent display device 100 on the image IM is detected by the image analysis unit 310 of the processing device 300 to obtain the position of the display anchor point P11 in a three-dimensional space. The display anchor point P11 is a point in a three-dimensional space, and the space calculation unit 320 can obtain the image capturing angle A2 of the image capturing device 200 to estimate the position of the display anchor point P11 on the image IM in a three-dimensional space.

In step S145, the overlap corresponding to the display anchor point P11 on the image IM is detected by the image analysis unit 310 of the processing device 300 to obtain the position of the background object anchor point P51 in a three-dimensional space. The fingertip 910 is a dot in a three-dimensional space. The space calculation unit 320 can obtain the image capturing angle A2 of the image capturing device 200 to estimate the position of the overlap corresponding to the display anchor point P11 on the image IM in a three-dimensional space (that is, the background object anchor point P51).

Then, the method proceeds to step S146, whether all of the background object anchor points P51 to P54 are already calculated is determined by the space calculation unit 320 of the processing device 300. If not all of the background object anchor points P51 to P54 are calculated, then the method returns to step S141, and the calculation of the background object anchor points P51 to P54 continues. If all of the background object anchor points P51 to P54 are already calculated, then the method proceeds to step S150.

The gaze point P0 can be located at the center of a region surrounded by the display anchor points P11 to P14. The quantity of display anchor points is not limited to 4, and when the quantity of display anchor points is greater than or equivalent to 3, the gaze point P0 can be located at the center of a region surrounded by the display anchor points.

After the display anchor points P11 to P14 and the background object anchor points P51 to P54 are obtained, the arithmetic program can be executed subsequently to calculate the equivalent eye position EP.

Then, the method proceeds to step S150, a plurality of visual extension lines L11 to L14 extending from the display anchor points P11 to P14 and the corresponding background object anchor points P51 to P54 are obtained by the space calculation unit 320 of the processing device 300. For example, the display anchor point P11 and the corresponding background object anchor point P51 form the visual extension line L11; the display anchor point P12 and the corresponding background object anchor point P52 form the visual extension line L12, and the rest can be obtained by the same analogy. As indicated in FIG. 4, the user 900 clicks on the overlap on the background object 500 corresponding to the display anchor points P11 to P14 according to his/her sight, that is, the background object anchor points P51 to P54. Therefore, the visual extension lines L11 to L14 basically will focus at the same place.

Then, step S160, the equivalent eye position EP of the ocular dominance of the user 900 in a three-dimensional space is obtained by the space calculation unit 320 of the processing device 300 according to an intersection of the visual extension lines L11 to L14. The equivalent eye position EP is located between the left eye EL and the right eye ER of the user 900.

Then, the method proceeds to step S170, a correspondence relationship RS between the facial feature ID and the equivalent eye position EP is recorded by the space calculation unit 320 of the processing device 300, and is stored in the storage unit 400. When the user 900 uses the transparent display system 1000 again, the space calculation unit 320 can directly inquire the correspondence relationship RS stored in the storage unit 400 according to the facial feature ID to obtain the equivalent eye position EP of the user 900.

Figure 7:
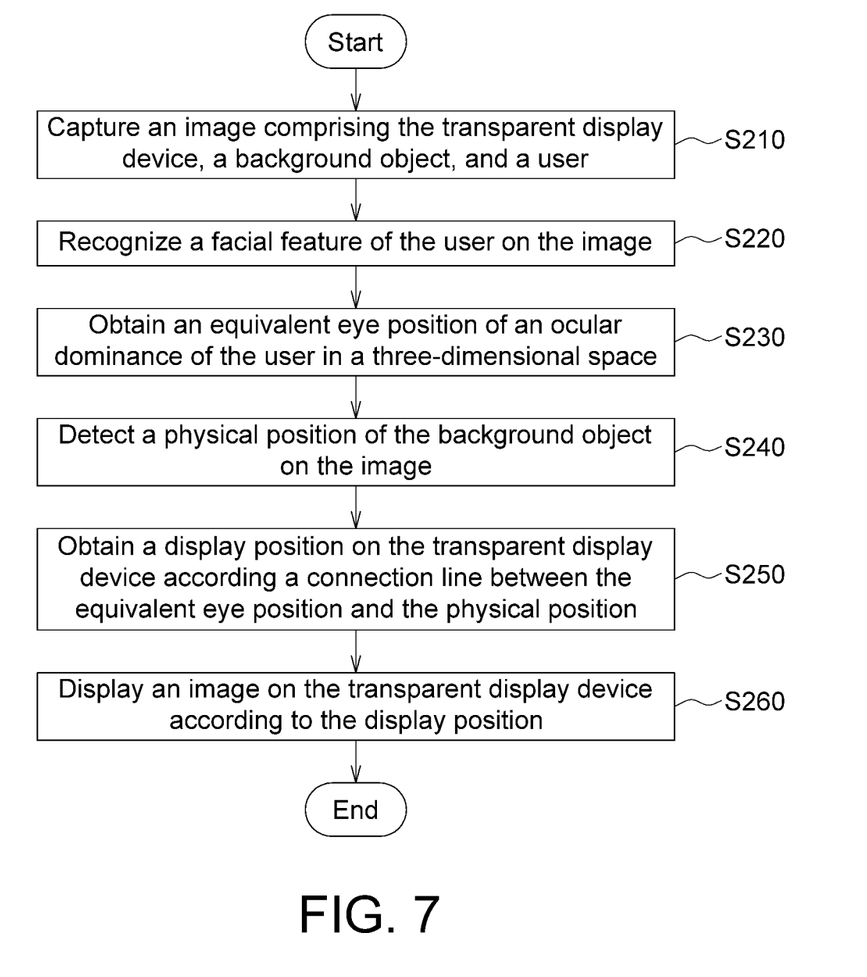
FIG. 7 is a flowchart of an image outputting method for a transparent display system according to an embodiment.
Figure 8:
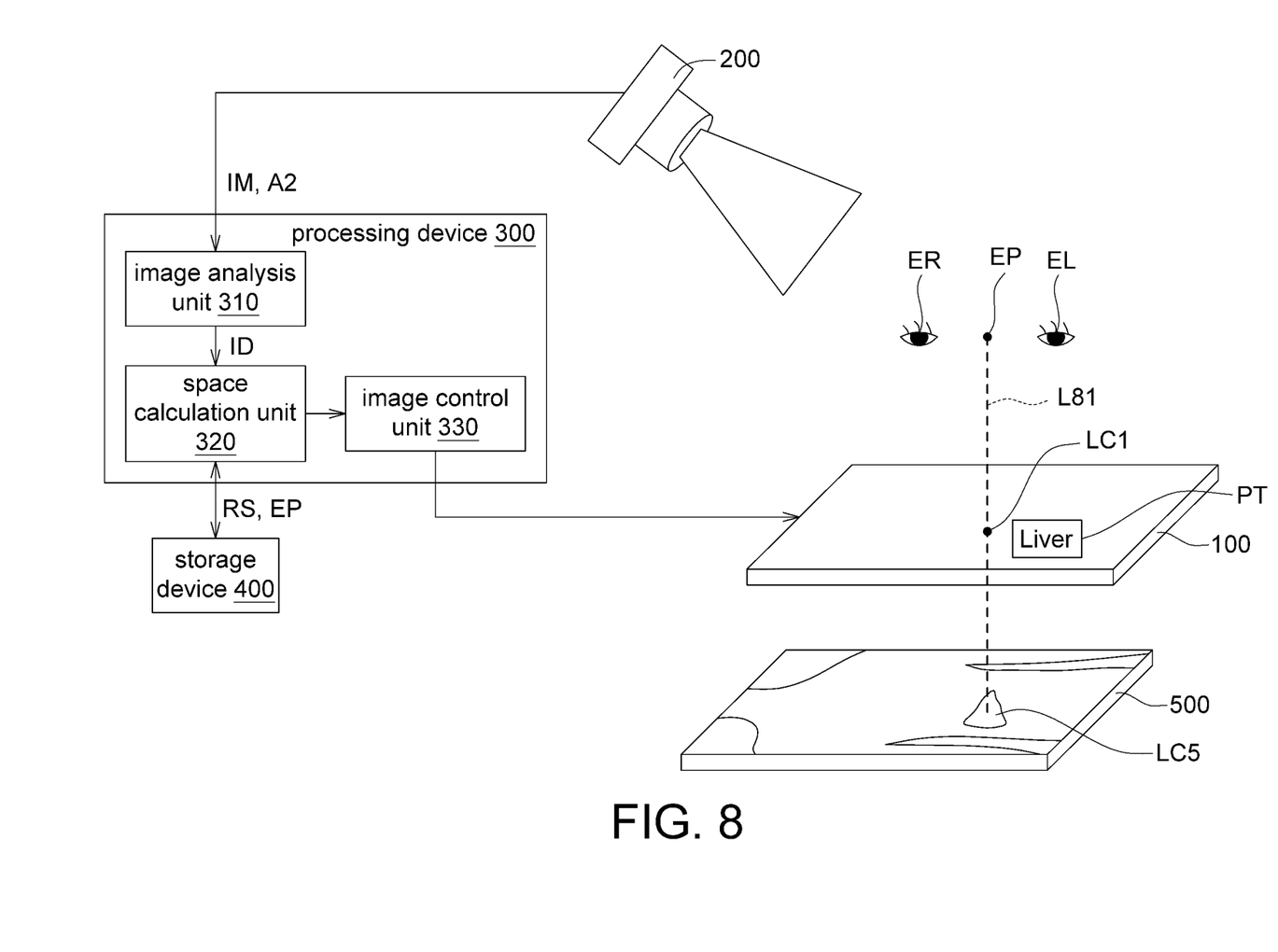
FIG. 8 is an exemplary diagram explaining the image outputting method.

Through the above process, the equivalent eye position EP can be obtained. The equivalent eye position EP is an accurate position between the right eye ER and the left eye EL. The transparent display device 100 can output an image with a specific position, a specific size and a specific angle of rotation according to the equivalent eye position EP. Refer to FIGS. 7 to 8. FIG. 7 is a flowchart of an image outputting method for a transparent display system 1000 according to an embodiment. FIG. 8 is an exemplary diagram explaining the image outputting method.

Firstly, the method begins at step S210, an image IM including the transparent display device 100, the background object 500 and the user 900 is captured by an image capturing device 200.

Next, the method proceeds to step S220, a facial feature ID of the user 900 on the image IM is recognized by the image analysis unit 310 of the processing device 300.

Then, the method proceeds to step S230, a correspondence relationship RS stored in the storage unit 400 is inquired by the space calculation unit 320 of the processing device 300 according to the facial feature ID to obtain an equivalent eye position EP of an ocular dominance of the user 900 in a three-dimensional space.

Then, the method proceeds to step S240, a physical position LC5 of the background object 500 on the image IM, such as the position of the liver photo on the background object 500 of FIG. 8, is detected by the image analysis unit 310 of the processing device 300.

Then, the method proceeds to step S250, a display position LC1 on the transparent display device 100 is obtained by the space calculation unit 320 of the processing device 300 according to at least a connection line L81 between the equivalent eye position EP and the physical position LC5. The display position LC1 is a point through which connection line L81 passes the transparent display device 100.

Then, the method proceeds to step S260, an image PT is displayed on the transparent display device 100 by the image control unit 330 of the processing device 300 according to the display position LC1. Through the above embodiment, the equivalent eye position EP can be used to correct the display position of the image on the transparent display device 100 according to the degree of parallax of the user 900, such that the correct position can be displayed on the image PT. When the user 900 is viewing the image PT, the image PT can be accurately superimposed on a corresponding position on the background object 500.

Since each user 900 has his/her won degree of parallax, the above parallax correction method can be separately executed for individual user 900 to obtain the equivalent eye position EP of individual user. The above image outputting method can be separately executed for individual user 900 to output the image PT according to his/her equivalent eye position EP.

Figure 9:
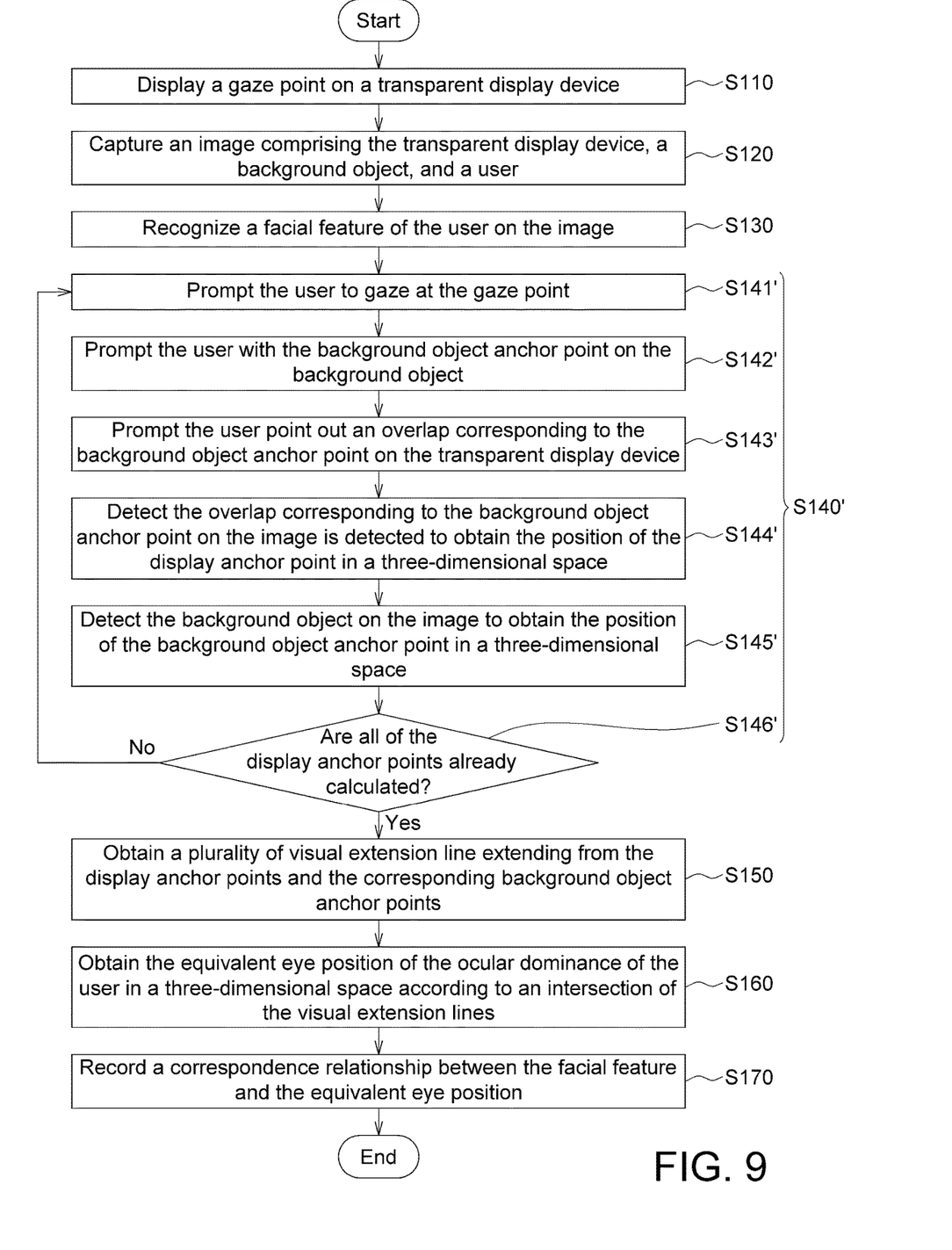
FIG. 9 is a flowchart of a parallax correction method according to another embodiment.
Figure 10:
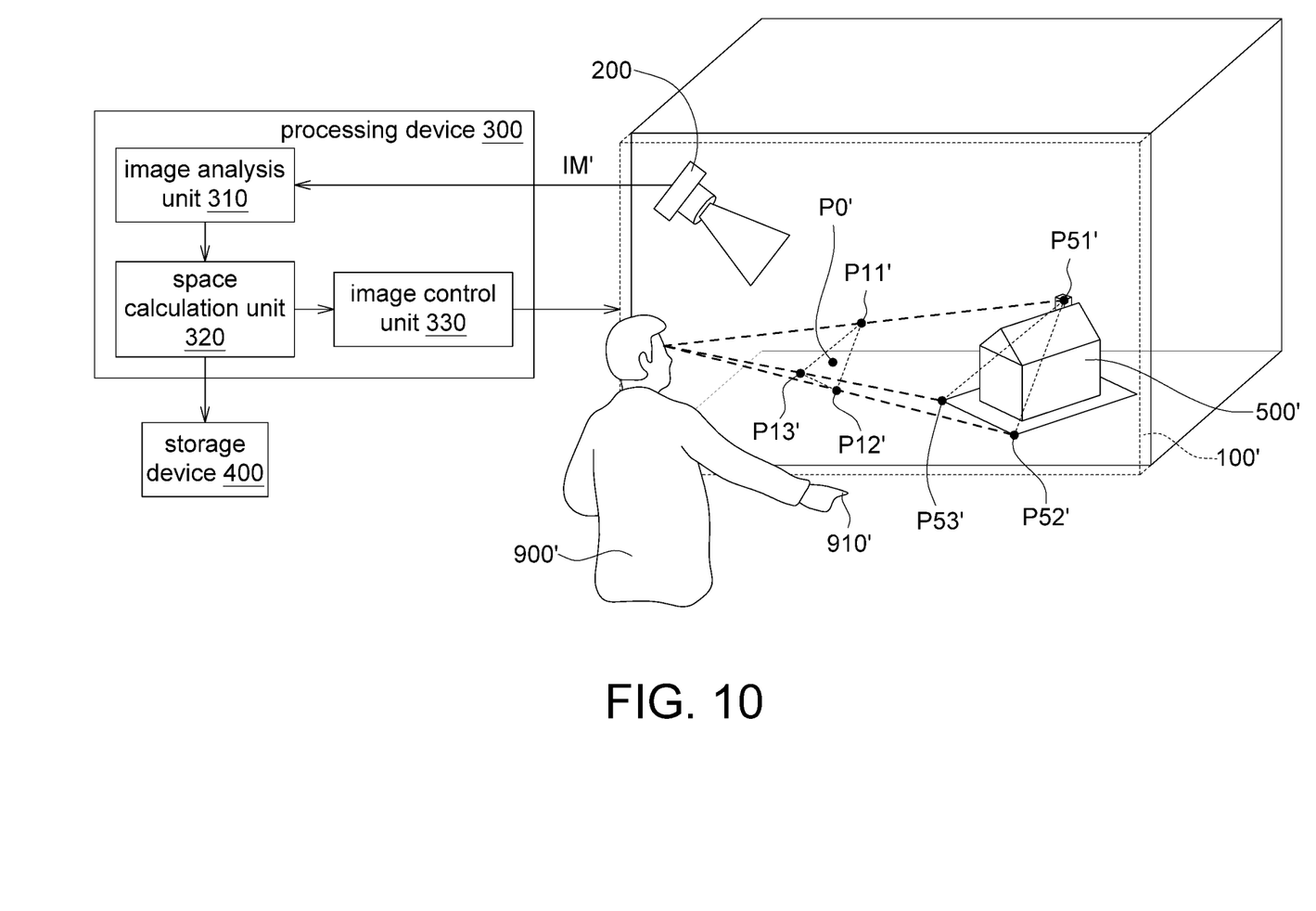
FIG. 10 is an exemplary diagram of each step of FIG. 9 exemplified by a commodity display box in a smart retail field.

Refer to FIGS. 9 to 10. FIG. 9 is a flowchart of a parallax correction method according to another embodiment. FIG. 10 is an exemplary diagram of each step of FIG. 9 exemplified by a commodity display box in a smart retail field. In the present embodiment, the user 900' may not be able to click on the background object 500' with his/her fingertip 910'. Therefore, in the parallax correction method of FIG. 9, the background object anchor points P51' to P53' can be pre-determined, and the user 900' is allowed to click on the display anchor points P11' to P13' according to his/her sight. Thus, the real sight of the user 900' can also be confirmed.

FIG. 9 is different from FIG. 6 in step S140', and the other steps are similar and are not repeated here. Step S140' includes steps S141' to S146'. In step S141', the user 900' is prompted to gaze at a gaze point P0'. In the present step, a reminder text (such as "Please gaze at the red dot at the center") can be displayed through the transparent display device 100'; or a reminder voice can be played through a speaker.

Then, the method proceeds to step S142', the user 900' is prompted with the background object anchor point P51' on the background object 500'. In the present step, a reminder text (such as "Please find out the top of the model") can be displayed through the transparent display device 100'; or a reminder voice can be played through a speaker.

Then, the method proceeds to step S143', the user 900' is prompted to point out the overlap corresponding to the background object anchor point P51' on the transparent display device 100' with a fingertip 910'. In the present step, a reminder text (such as "Please point out the top of the model on the screen with your finger") can be displayed through the transparent display device 100'; or a reminder voice can be played through a speaker.

Then, the method proceeds to step S144', the overlap corresponding to the background object anchor point P51' on the image IM' is detected by the image analysis unit 310 of the processing device 300 to obtain the position of the display anchor point P11' in a three-dimensional space.

Then, the method proceeds to step S145', the background object 500' on the image IM' is detected by the image analysis unit 310 of the processing device 300 to obtain the position of the background object anchor point P51' in a three-dimensional space.

Then, the method proceeds to step S146', whether all of the display anchor points P11' to P13' are already calculated is determined by the space calculation unit 320 of the processing device 300. If not all of the display anchor points P11' to P13' are calculated, then the method returns to step S141', and the calculation of the display anchor points P11' to P13' continues. If all of the display anchor points P11' to P13' are already calculated, then the method proceeds to step S150.

After the display anchor points P11' to P13' and the background object anchor points P51' to P53' are obtained, then the arithmetic program can be executed subsequently to calculate the equivalent eye position EP.

Figure 11:
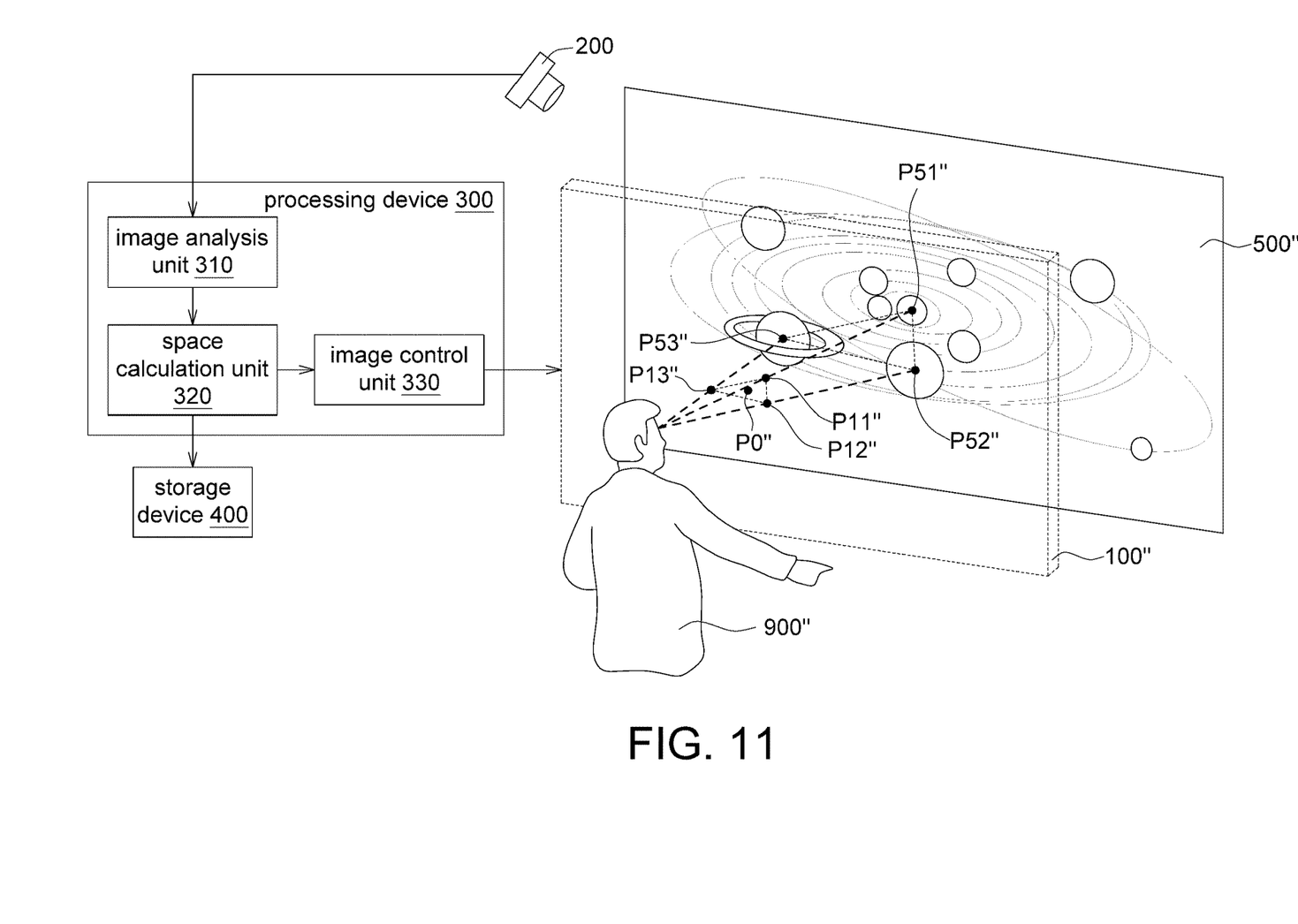
FIG. 11 is an exemplary diagram of each step of FIG. 9 exemplified by a projection curtain in a smart entertainment field.

Referring to FIG. 11, an exemplary diagram of each step of FIG. 9 exemplified by a projection curtain in a smart entertainment field is shown. In the field of smart entertainment, the user 900" does not directly contact the background object 500" (that is, the projection curtain). The embodiment of FIG. 11 can also be used in the parallax correction method of FIG. 9. The background object anchor points P51" to P53" can be pre-determined, and the user 900" is allowed to click on the display anchor points P11" to P13" according to his/her sight when gazing at a gaze point P0". Thus, the real sight of the user 900" can also be confirmed.

As disclosed in above embodiments, the transparent display system 1000 can calculate the equivalent eye position EP of the ocular dominance of the users 900, 900', and 900" using the parallax correction method. The equivalent eye position EP is an accurate position between the right eye ER and the left eye EL of individual user and can be used to correct the display position of the image on the transparent display devices 100, 100', and 100" according to the degree of parallax of individual user, such that the image PT can be displayed at a correct position. When the users 900, 900', and 900" are viewing the image PT, the image PT can be accurately superimposed on a corresponding position on the background objects 500, 500', and 500".

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A parallax correction method for a transparent display system, wherein a transparent display device is located between a background object and a user, and the parallax correction method comprises:
   displaying a gaze point on the transparent display device;
   capturing an image comprising the transparent display device, the background object, and the user;
   detecting at least two display anchor points and at least two corresponding background object anchor points according to the image, wherein the display anchor points are located on the transparent display device, and the background object anchor points are located on the background object;
   obtaining a plurality of visual extension lines extending from the display anchor points and the corresponding background object anchor points; and
   obtaining an equivalent eye position, which is located between a right eye and a left eye of the user, of an ocular dominance of the user according to an intersection of the visual extension lines.

2. The parallax correction method according to claim 1, wherein the gaze point is located in front of the user.

3. The parallax correction method according to claim 1, wherein the step of detecting the display anchor points and the corresponding background object anchor points comprises:
   displaying each of the display anchor points on the transparent display device;
   prompting the user to gaze at the gaze point;
   prompting the user to point out an overlap of each of the display anchor points on the background object;
   detecting the transparent display device on the image to obtain a position of each of the display anchor points in a three-dimensional space; and
   detecting each of the overlaps on the image to obtain a position of each of the background object anchor points in a three-dimensional space.

4. The parallax correction method according to claim 1, wherein the step of detecting the display anchor points and the corresponding background object anchor points comprises:
   prompting the user to gaze at the gaze point;
   prompting the user with a position of each of the background object anchor points on the background object;
   prompting the user to point out an overlap of each of the background object anchor points on the transparent display device;
   detecting each of the overlaps on the image to obtain each of the display anchor points; and
   detecting the background object on the image to obtain the position of each of the background object anchor points in a three-dimensional space.

5. The parallax correction method according to claim 1, wherein the gaze point is located at a center of a region surrounded by the display anchor points.

6. The parallax correction method according to claim 1, further comprising:
   recognizing a facial feature of the user on the image; and
   recording a correspondence relationship between the facial feature and the equivalent eye position.

7. The parallax correction method according to claim 1, wherein the equivalent eye position is located between the user's two eyes.

8. An image outputting method for a transparent display system, wherein a transparent display device is located between a background object and a user, and the image outputting method comprises:
   capturing an image comprising the transparent display device, the background object, and the user;

obtaining an equivalent eye position, which is located between a right eye and a left eye of the user, of an ocular dominance of the user according to an intersection of a plurality of visual extension lines, where the visual extension lines extend from at least two display anchor points and at least two background object anchor points, wherein the display anchor points are located on the transparent display device, and the background object anchor points are located on the background object;

obtaining a physical position of the background object on the image;

obtaining a display position on the transparent display device according to at least a connection line between the equivalent eye position and the physical position; and displaying an image on the transparent display device according to the display position.

9. The image outputting method according to claim 8, wherein the equivalent eye position is located between the user's two eyes.

10. The image outputting method according to claim 8, further comprising:

recognizing a facial feature of the user on the image;

wherein, in the step of obtaining the equivalent eye position, the equivalent eye position is obtaining by inquiring a storage unit according to the facial feature.

11. A transparent display system, comprising:

a transparent display device located between a background object and a user and configured to display a gaze point;

an image capturing device configured to capture an image comprising the transparent display device, the background object, and the user;

a processing device connected to the image detection device, wherein the processing device comprises:

an image analysis unit configured to detect at least two display anchor points and at least two corresponding background object anchor points on the image, wherein the display anchor points are located on the transparent display device, and the background object anchor points are located on the background object; and a space calculation unit configured to calculate a visual extension line extending from each of the display anchor points and each of the corresponding background object anchor points, and calculate an equivalent eye position, which is located between a right eye and a left eye of the user, of an ocular dominance of the user according to an intersection of the visual extension lines and the connection line between the two eyes; and a storage unit configured to record the equivalent eye position.

12. The transparent display system according to claim 11, wherein the gaze point is located in front of the user.

13. The transparent display system according to claim 11, wherein the transparent display device further displays each of the display anchor points, and prompts the user to gaze at the gaze point and to point output an overlap of each of the display anchor points on the background object;

the image analysis unit detects the transparent display device on the image to obtain each of the display anchor points, and further detects each of the overlaps to obtain each of the background object anchor points on the image.

14. The transparent display system according to claim 11, wherein the transparent display device further prompts the user to gaze at the gaze point, prompts the user with a position of each of the background object anchor points on the background object, and prompts the user to point out an overlap of each of the background object anchor points on the transparent display device;

the image analysis unit detects each of the overlaps on the image to obtain a position of each of the display anchor points in a three-dimensional space, and further detects the background object on the image to obtain the position of each of the background object anchor points in a three-dimensional space.

15. The transparent display system according to claim 11, wherein the gaze point is located at the center of a region surrounded by the display anchor points.

16. The transparent display system according to claim 11, wherein the image analysis unit further detects a physical position of the background object on the image, the space calculation unit obtains a display position on the transparent display device according to at least a connection line between the equivalent eye position and the physical position, and the processing device further comprises:

an image control unit configured to display an image on the transparent display device according to the display position.

17. The transparent display system according to claim 11, wherein the equivalent eye position is located between the user's two eyes.

18. The transparent display system according to claim 11, wherein the image analysis unit is further configured to recognize a facial feature of the user on the image, and the storage unit is further configured to record a correspondence relationship between the facial feature and the equivalent eye position.

* * * * *